(12) United States Patent
Craik et al.

(10) Patent No.: US 11,061,704 B2
(45) Date of Patent: *Jul. 13, 2021

(54) LIGHTWEIGHT AND PRECISE VALUE PROFILING

(71) Applicant: International Business Machines Corporation, Armonk, NY (US)

(72) Inventors: Andrew J. Craik, North York (CA); Joseph Devin Micheal Papineau, Toronto (CA); Nicholas J. Coughlin, Brisbane (AU)

(73) Assignee: International Business Machines Corporation, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/695,238

(22) Filed: Nov. 26, 2019

(65) Prior Publication Data

US 2020/0097306 A1 Mar. 26, 2020

Related U.S. Application Data

(63) Continuation of application No. 15/988,248, filed on May 24, 2018, now Pat. No. 10,552,185.

(51) Int. Cl.
*G06F 9/455* (2018.01)
*G06F 16/901* (2019.01)

(52) U.S. Cl.
CPC ........ *G06F 9/4552* (2013.01); *G06F 9/45525* (2013.01); *G06F 16/9014* (2019.01); *G06F 16/9024* (2019.01)

(58) Field of Classification Search
CPC .............. G06F 9/4552; G06F 16/9014; G06F 16/9024; G06F 9/45525
See application file for complete search history.

(56) References Cited

U.S. PATENT DOCUMENTS

| | | | |
|---|---|---|---|
| 5,930,509 A | 7/1999 | Yates et al. | |
| 6,341,371 B1 | 1/2002 | Tandri | |
| 6,658,652 B1 | 12/2003 | Alexander, III et al. | |
| 7,185,331 B2 * | 2/2007 | Talati | G06F 8/656 |
| | | | 717/168 |

(Continued)

OTHER PUBLICATIONS

Haibing Guan et al. "A Runtime Profile Method for Dynamic Binary Translation Using Hardware-Support Technique", [Online], pp. 4683-4687, [Retrieved from Interent on Feb. 26, 2021], <https://ieeexplore.ieee.org/stamp/stamp.jsp?arnumber=5455266> (Year: 2009).*

(Continued)

*Primary Examiner* — Ziaul A Chowdhury
(74) *Attorney, Agent, or Firm* — Jeffrey M. Ingalls

(57) ABSTRACT

A profiling implementation method for reducing overhead while an application is running with profiling instrumentation inserted but disabled; the method for gathering precise profiling data for a subset of observed values at runtime start; generating an index for each observed value; populating one or more data structures within a hash table with the subset of observed values to count; comparing a corresponding key at the index value of an observed value index; evaluating a value limit of the hash table; incrementing a matched key counter; incrementing an alt-counter; locking the hash table; and updating one or more data structures of the hash table.

12 Claims, 7 Drawing Sheets

(56) References Cited

U.S. PATENT DOCUMENTS

| | | | |
|---|---|---|---|
| 7,877,734 | B2 | 1/2011 | Branda et al. |
| 8,819,649 | B2 | 8/2014 | Lafreniere et al. |
| 9,027,006 | B2 | 5/2015 | Pizlo et al. |
| 9,361,078 | B2 | 6/2016 | Gao et al. |
| 2004/0044997 | A1 | 3/2004 | Talati et al. |
| 2004/0083347 | A1 | 4/2004 | Parson |
| 2004/0128446 | A1 | 7/2004 | Dulong |
| 2005/0138623 | A1* | 6/2005 | Fresko ............... G06F 9/4843 718/102 |
| 2006/0242636 | A1* | 10/2006 | Chilimbi ........... G06F 11/3612 717/158 |
| 2010/0262954 | A1 | 10/2010 | Roos |
| 2010/0287352 | A1 | 11/2010 | Chapman et al. |
| 2012/0005460 | A1 | 1/2012 | Inoue |
| 2012/0323970 | A1 | 12/2012 | Larson et al. |
| 2013/0031536 | A1 | 1/2013 | De et al. |
| 2013/0125103 | A1 | 5/2013 | Odaira |
| 2013/0205286 | A1 | 8/2013 | Barraclough et al. |
| 2013/0332710 | A1 | 12/2013 | Kruglick |
| 2014/0053143 | A1 | 2/2014 | Conrod et al. |
| 2015/0067658 | A1 | 3/2015 | Hahnenberg |
| 2015/0309789 | A1 | 10/2015 | Thorat |
| 2016/0062878 | A1 | 3/2016 | Westrelin et al. |
| 2016/0071233 | A1 | 3/2016 | Macko et al. |
| 2018/0375953 | A1 | 12/2018 | Mont et al. |
| 2019/0042277 | A1 | 2/2019 | Nachimuthu et al. |

OTHER PUBLICATIONS

Qiong Zou et al., "Runtime Engine for Dynamic Pro-le Guided Stride Prefetching", [Online], pp. 633-643, [Retrieved from Internet on Feb. 26, 2021] , <http://scholar.google.com/scholar_url?url=https%3A%2F%2Flink.springer.com%2Fcontent%2Fpdf> (Year: 2008).*

Soham Sundar Chakraborty et al., "Static Analysis Based Application Specific Dispatch Table Compaction", [Online], pp. 48-53, [Retrieved from Internet on Feb. 26, 2021], <https://ieeexplore.ieee.org/stamp/stamp.jsp?arnumber=4425950>, (Year: 2007).*

Robert Dietrich et al., "OpenACC Programs Examined: A Performance Analysis Approach", [Online], pp. 310-319, [Retrieved from Internet on Feb. 26, 2021], <https://ieeexplore.ieee.org/stamp/stamp.jsp?arnumber=7349586> (Year: 2015).*

Craik, et al., "Add Value JProfiling #677", Last printed Feb. 16, 2018, 6 pages, Evidence of Grace Period Use or Sale. <https://github.com/eclipse/openj9/pull/677>.

Hirt, Marcus, "Low Overhead Method Profiling with Java Mission Control", Marcus Hirt Life, Java and Everything, Sep. 11, 2013, 8 pages. <http://hirt.se/blog/?p=364>.

Kumar, et al., "Low Overhead Program Monitoring and Profiling", PASTE'05, Sep. 5-6, 2005, Lisbon, Portugal, pp. 28-34.

Mera et al., "Combining Static Analysis and Profiling for Estimating Execution Times", Technical University of Madrid, 2007, 15 pages. <http://oa.upm.es/14336/1/HER ME_ARC_2007-6.pdf>.

Mera et al., "Towards Execution Time Estimation for Logic Programs via Static Analysis and Profiling", Technical University of Madrid, Jan. 2007, 16 pages. <https://arxiv.org/pdf/cs/0701108.pdf>.

Ogata et al., "Replay Compilation: Improving Debuggability of a Just-in-Time Compiler", ACM, OOPSLA, 2006, 11 pages. <http:I/delivery.acm.org/10.1145/1170000/1167493/p241-ogata.pdf>.

Wang et al., "Runtime Verification of Traces Under Recording Uncertainty", Department of Computer and Information Science, University of Pennsylvania, 2011, 15 pages. <https://repository.upenn.edu/cgi/viewcontent.cgi?article=1791&context=cis_papers>.

List of IBM Patents or Patent Applications Treated As Related, dated Nov. 25, 2019, 2 pages.

Craik et al., "Lightweight and Precise Value Profiling", U.S. Appl. No. 15/988,248, filed May 24, 2018.

* cited by examiner

LIGHTWEIGHT AND PRECISE VALUE PROFILING

BACKGROUND

The present invention relates to programming language, and more specifically, to compiler technology.

A complier is computer software that transforms computer code written in one programming language (e.g., source language) into a machine-code or lower-level form (e.g., target language).

SUMMARY

Aspects of the present disclosure are directed to a value profiling implementation method for reducing overhead. The method can comprise gathering precise profiling data for a subset of observed values at runtime start. The method can further comprise generating an index for each observed value. The method can additionally comprise populating one or more data structures within a hash table with the subset of observed values to count. Next the method can comprise comparing a corresponding key at the index value of an observed value index. Lastly, in a response to a determination that the corresponding key at the observed value index matches the corresponding observed value index, the method can comprise incrementing a matched key counter.

Aspects of the present disclosure are directed to a value profiling implementation method for reducing overhead while an application is running with profiling instrumentation inserted but disabled. The method can comprise gathering precise profiling data for a subset of observed values at runtime start. The method can additionally comprise generating an index for each observed value. The method can further comprise populating one or more data structures within a hash table with the subset of observed values to count. Next, the method can comprise comparing a corresponding key at the index value of an observed value index. In a response to a determination that the corresponding key at the observed value index does not match the corresponding observed value index, the method can then comprise evaluating a value limit of the hash table. Lastly, in a response to a determination that the value limit of the hash table has been reached, the method can comprise incrementing an alt-counter, where the alt-counter represents the counter for uncounted recorded executed cases.

Aspects of the present disclosure are directed to a profiling implementation method for reducing overhead while an application is running with profiling instrumentation inserted but disabled. The method can comprise gathering precise profiling data for a subset of observed values at runtime start. The method can further comprise generating an index for each observed value. The method can additionally comprise populating one or more data structures within a hash table with the subset of observed values to count. Next, the method can comprise comparing a corresponding key at the index value of an observed value index. In a response to a determination that the corresponding key matches the observed value index, the method can further comprise evaluating a value limit of the hash table. In a response to a determination that the value limit of the hash table has not been reached, the method can further comprise locking the hash table. In a response to a determination that the hash table failed to lock, the method can additionally comprise incrementing the alt-counter. Lastly, in a response to a determination that the hash table successfully locked, the method can comprise updating one or more data structures of the hash table.

Aspects of the present disclosure are directed to a profiling implementation system for reducing overhead while an application is running with profiling instrumentation inserted but disabled, a computer readable storage medium storing a corpus of data, a user interface configured to receive input and present output, and a processor communicatively coupled to the computer readable storage medium and the user interface and having a memory comprising instructions. The instructions can be configured to gather precise profiling data for a subset of observed values at runtime start. The instructions can further be configured to generate an index for each observed value. The instructions can additionally be configured to populate one or more data structures within a hash table with the subset of observed values to count. Next, the instructions can be configured to compare a corresponding key at the index value of an observed value index. Lastly, in a response to a determination that the corresponding key at the observed value index matches the corresponding observed value index, the instructions can be configured to increment a matched key counter.

Aspects of the present disclosure are further directed to a computer program product for a value profiling implementation to reduce overhead while an application is running with profiling instrumentation inserted but disabled. The computer program product comprises a computer readable storage medium having program instructions embodied therewith, the program instructions, executable by a processor. The program instructions can cause the processor to gather precise profiling data for a subset of observed values at runtime start. The program instructions can further cause the processor to generate an index for each observed value. The program instructions can additionally cause the processor to populate one or more data structures within a hash table with the subset of observed values to count. Next, the program instructions can additionally cause the processor to compare a corresponding key at the index value of an observed value index. Lastly, in a response to a determination that the corresponding key at the observed value index matches the corresponding observed value index, the program instructions can cause the processor to increment a matched key counter.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
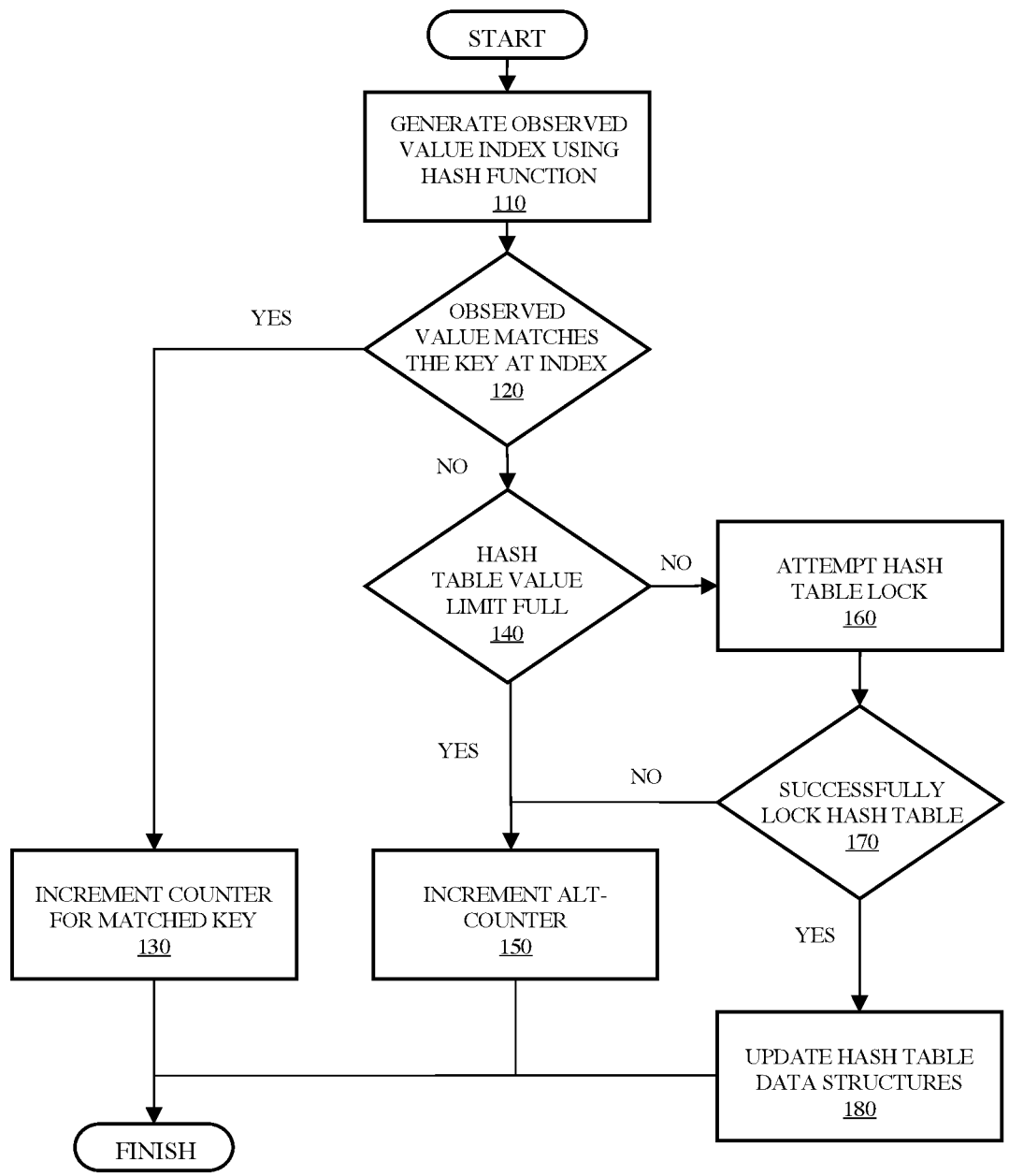
FIG. 1 is a flow diagram illustrating an example profiling instrumentation method for incrementing a corresponding counter, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to programming language, and more specifically, to compiler technology. While the present disclosure is not necessarily limited to such application, various aspects of the disclosure may be appreciated through a discussion of various examples using this context.

Profiling is a form of dynamic program analysis used to aid program optimization (e.g., efficiency). Typically, profiling is achieved by instrumentation, in which program profilers can be configured to measure either a programs source code or binary executable form. In program optimization, an optimizer can be frequently written to operate statically, so to make conservative behavioral assumptions based on the language and syntax semantics of a running program without knowledge of the execution behavior. Due to an optimizer's inability to differentiate between the program code for the most frequently executed cases (e.g., recurring sequence of execution within the program), conservatism comes at the cost of runtime performance. Generally, slow runtime performance is undesirable, as it can lead to low program throughput, high memory overhead, or other suboptimal behavior. For example, if an optimizer is unable to specialize the code for the most frequently executed cases (e.g., routine call), performance degradation will usually result.

Just-in-Time (JIT) compilers can improve the inefficiency general optimizers encounter by compiling the application while it is running. JIT compilation can be especially helpful for dynamic programming languages (e.g., Java) where static compilation is especially difficult, and more specifically, when embodiments cannot statistically determine everything necessary to efficiently optimize the application. A JIT complier can benefit from runtime profiling information and improve the quality of generated code provided past program behavior reliably predicts future behavior. Runtime profiling for the purposes of program optimization generally consists of two different classes of information: code execution frequency information and value profiling information. Code execution frequency information, also known as block frequency information, aims to describe how frequently different operations of an application execute relative to one another. Value profiling information is concerned with recoding specific computation results during program execution including, but not limited to, the types of objects reaching type tests, the targets of a virtual method dispatches, and the lengths of arrays and strings.

Aspects of the present disclosure relate to Java Virtual Machines (JVM), and more specifically, a set of techniques which facilitate the gathering of runtime value profiling information with very low overhead. In the JVM (e.g., IBM J9), the initial profiling used to guide JIT compilation is produced by the Java bytecode interpreter loop. Due to compilation and throughput reduction incurred when profiling instrumentation is added to a generated source code, additional profiling information is, in general, not gathered when executing JIT compiled methods. When a method is determined to be important, for example the application spends more than 12% of its execution time running the method, the compiler can generate a compiled implementation with profiling instrumentation to facilitate further optimization. Generally, however, these profiling compilations are undesirable, as they are expensive in regard to compile-time, code cache usage, memory consumption, and throughput overhead.

Aspects of the present disclosure further use profiling implementations to gather precise (e.g., seen rather than sampled) frequency information for a subset of values at runtime using a key and counter set which also contains an alt-counter for counting values not in the key set (e.g., ignored values). In doing so, embodiments address the number of observed values used to construct profiling data. Implementation can populate data structures of a JVM's built in memory hash table with values to count during execution, so that it is possible to clear gathered profiling information while the application is running should the number of uncounted values, represented by the alt-counter, prove excessive. The design of the counting infrastructure has the additional benefit of allowing the implementation to be disabled in a way which incurs only a very small throughput performance penalty and which can be easily enabled through runtime code modification.

Reducing the profiling instrumentation's overhead is beneficial, as doing so reduces perturbation of the program's behavior caused by attempting to observe that behavior. This can, in turn, lead to higher quality profiling data with less impact on the performance of the application being profiled. The ability to easily enable and disable profiling code through runtime code patching can facilitate a variety of control heuristics that allow the JIT compiler and its associated runtime system to better recover from phase changes in the program's execution without recompiling methods to add or remove profiling infrastructure.

Tests of embodiments of the techniques described herein on X86 backward-compatible instruction set architecture machines have shown performance improvements. For example, in one test implementation, X86 machines incurred a 15% reduction in throughput as compared to a conventional value profiling implementation which incurred a throughput reduction of over 95%. Furthermore, the overhead decreased below 1% when the counters were inserted but in a disabled state. The profiling infrastructure caused a 57 MB increase in memory due to the additional metadata and profiling data structures, very similar to that observed with a conventional value profiling implementation. Implementations on other platforms (e.g., POWER and Z Systems of IBM) observed a similarly low overhead (20% to 30% throughput degradation); that is to say that these techniques have been demonstrated to work on a variety of computer architectures and are not dependent on specific hardware features.

Referring now to the figures, FIG. 1 is a flow diagram illustrating an example method 100 for updating the hash table through profiling instrumentation with an observed value, in accordance with embodiments of the present disclosure. A hash table uses a hash function to compute an index into an array of buckets or slots, from which the correct value can be found. In embodiments, the method 100 attempts to gather runtime value profiling information in a manner which minimizes the reduction in program throughput and the memory overhead of the data structures used to record profiling information. Value profiling allows for the identification of common values and properties with which a JIT compiler can produce code tailored to the most frequently executed cases.

At runtime, for the benefit of compiler optimization, information pertaining to the frequency (e.g., rate of occurrence) at which profiled values are observed is tracked. At block 110, using the hash function of the present embodiment, an index for an observed value is calculated during execution, hereinafter referred as observed value index.

In some implementations, the hash function of an observed value may be computed via parallel bit extraction when the hash function has nominated n arbitrary bit positions, either as an index or a mask as the hash function.

In alternative embodiments without specific hardware acceleration, nominating n arbitrary bit positions can be implemented as a series of individual bit extracts aggregated into a final index through a manual gather process.

In embodiments, a subset of bits relating to the number of hash table entries and the number of distinct observed values is guaranteed to be tracked by the profiling infrastructure. The hash table contains 2 n key and counter sets capable of representing profiling data for n+1 counted (e.g., recorded) profiled values. In various implementations, one or more bit differences between each value committed to the hash table's key are used, with n bits to distinguish between n+1 values, where n is a variable representing the plurality of bits required to create an offset into the hash table and distinguish the profiled values.

Profiling data has associated metadata so that information gathered can be associated with the original program code. In various implementations, this metadata consists of a bytecode instruction offset in a given method, an enclosing method, and the enclosing method's an associated call stack. Profiling data can be the result of tracking any number of values of interest to the optimizer such as program stored values or specialized instrumentation capable of recording properties of those values (e.g., string length, content).

Through the means of maintaining an alt-counter, a fourth, unrecorded, profiled value, can be tracked. The fourth profiled value can further comprise the subset of extracted observed values throughout implementation and can be later stored in an alt-counter array block of the hash table. In embodiments, the uncounted value is tracked using the hash function as to determine if a collision occurs between data structures at the byte code value index. In embodiments, because the alt-counter is an additional counter to count the number of values not being recorded that are encountered at runtime, the alt-counter can additionally be represented with integer n to distinguish between the number of profiled values and the associated number of bits. The integer n is vital for the optimizer to exploit the profiling information because it is necessary to have a notion of rate of presentation when only counting the subset of values.

Ideally, the hash function for profiling implementation should guarantee no collisions between values being counted. A collision occurs when the hash function produces the same hash code for two different input values. The hash function serves as a way of mapping an observed value to an entry in the hash table (e.g., key, counter, alt-counter) such that the most frequent values are stored as keys, with their respective counter set detailing the frequency with which they were seen. In embodiments, if the key matches, a hit is considered to have occurred, if the key does not match, a miss will occur initiating either an operation to add and an additional entry to the hash table and further adjust the hash function or increment the alt-counter. A hash function in block 110 computes an observed value index from the program value being profiled. At block 120, the observed value index is used to lookup a key from the profiling table which is matched to the program value to determine if a collision occurs. In response to a determination that the two values match the counter associated with the observed value index, an increment occurs. The observed value index at which comparison occurs, represents the observed value index established in block 110. For successful matching, both the key and counter will accurately reflect the same array value, indicating the relative frequency of an observed value is most commonly seen. For example, the observed value index established at block 110 is compared to the corresponding populated key in order to identify a match at block 120.

In embodiments, if a match occurs between the key held in the profiling table corresponding to observed value index computed by block 110 and the observed program value the counter corresponding to the observed value is incremented at block 130. In embodiments, it would be expected that the sequence of block 110, block 120 and block 130 would be the most likely to occur during program execution. Similar embodiments could place this sequence inline in the compiled code to maximize performance.

In alternative embodiments, if the value held in the profiling table corresponding to the observed value index computed by block 110 and the observed program value do not match, the implementation checks the number of entries currently in use in the hash table at decision 140. If the hash table is full, the alt-counter is incremented at block 150 and program execution resumes. If the hash table is not full, the profiling implementation attempts to acquire a lock on the profiling table at block 160. If the lock is not acquired at decision 170 then the implementation will execute the alt-counter increment at block 150 and program execution will resume. If the lock is successfully acquired at decision 170 the observed program value is added to the hash table, the table size is increased, and the hash function adjusted at block 180 before releasing the lock and resuming program execution.

In embodiments, the hash table can be resized using some form of conventional synchronization. In alternative embodiments, the method 100 can forgo the flexibility of conventional synchronization as to reduce the complexity of implementation and reduce the profiling overhead.

In some implementations, a separate management thread periodically inspects the hash tables to determine whether a set of highly frequent observed values have been potentially excluded from profiling. Such a determination is made by comparing the magnitude of the alt-counter with the sum of the counts of observed values. If a determination is made that profiled values no longer represent the most frequently observed program values, the management thread clears the hash table to its default state and the profiling code added to the compiled body will automatically repopulate the hash table. Control logic, conventional in the art, may be necessary to prevent oscillation, such as limiting the number of table resets and disabling profiling if the recorded values remain the same.

In response to a determination at decision 140 that the value limit of the hash table if not full yet, as determined by comparing the counter to the statically known maximum number of entries, the capacity of the hash table is updated (e.g., expanded) to include the newly observed value at block 160. As the set of recorded values comprised in the hash table expand, the time and memory management complexity typically grows linearly, potentially to an arbitrary limit.

In some implementations, the hash table does not support multiple threads concurrently modifying their contents and hash function. Accordingly, at block 160, an attempt to lock the hash table is initiated. Each array block has threads obtained by implementation and each thread competes for a low-level lock specific to the profiling data structure. In some embodiments, attempting to lock the hash table occurs only four times, one for each three frequently counted bytecode indices and one for the single uncounted bytecode index.

In response to locking the hash table, a determination is made at decision 170, regarding the success of the hash table lock. In embodiments, if the profiling observes a never before seen value and there exist unused entries in the hash table, then profiling will attempt to add the new value to the hash table such that their complexity can be accurately expressed. A phase change may occur, resulting in profiled values, potentially with high counts from a prior phase, that no longer correspond to the most frequently observed values. In response to a failed hash table locking attempt or phase detection, method 100 attributes the missed byte code value to an alt-counter, at block 150.

In response to a determination of successfully locking the hash table, data structures of the hash table are updated at block 180. The lock is released at the completion of the update. An example process of updating the data structures of the hash table is described in more detail below with respect to FIG. 2.

In embodiments, intermediate language is generated to perform two direct increment paths (block 130, block 150), with the hash table update (block 180) implemented as a helper call. Such implementations allow other compiler optimization passes the opportunity to reduce profiling overhead, as well as allow exiting analysis to request profiling during compilation, either of value in the original bytecode or complier generated intermediate results. In conventional embodiments, early optimization passes can identify profiling candidates, however, immediately inserting this instrumentation can add complexity and disrupt extended basic blocks. Moreover, earlier optimization passes must be updated to handle instrumentation. Therefore, it is strategic to initially represent profiling candidates using placeholder calls with the desired configuration as arguments. A transformation pass is applied later in the compile, but still early enough to benefit from other passes, to identify these calls and lower them into the intermediate language implementation representation.

In some embodiments, an undesirable race condition can occur between multiple threads operating to update the same array (e.g., incremented counter) at the same time without proper synchronization for the same hash table. For example, a race condition can occur when incrementing a counter through non-atomic increment operations. In embodiments, an increment can be lost (e.g., maximum error we can observe) when multiple threads try to increment a given counter. The non-atomic update will read the value of the counter, add one to the value and write the value back to memory. If multiple threads perform this operation, a scheduler may switch the context between threads such that multiple threads read a given counter value, all in one, and then write the same value. Accordingly, a compromise can be made to mitigate the potential loss and improve throughput. Increments may be lost but the increment technique ensures that even in the worst case of tightly competing threads, losses are minimal and distributed over the entire dataset to not distort relative rates of profiling.

It is noted that FIG. 1 is intended to depict the representative operations of an example method 100 for profiling instrumentation. In some embodiments, however, individual operations can have greater or lesser complexity than as represented in FIG. 1, operations other than or in addition to those shown in FIG. 1 can be present, and the number, type, and configuration of such operations can vary.

Figure 2:
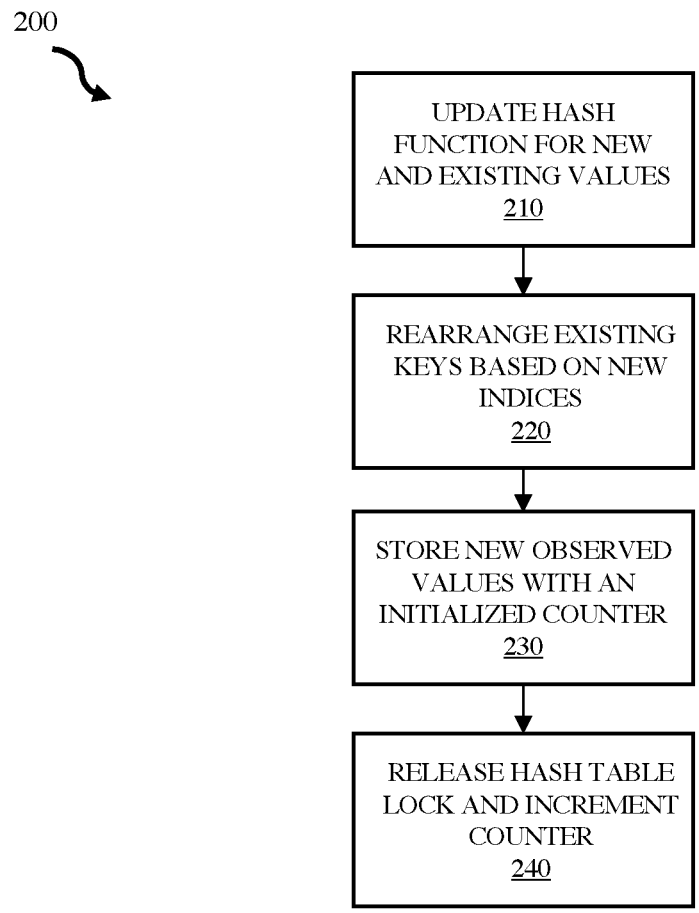
FIG. 2 is a flow diagram illustrating an example profiling instrumentation method for updating a hash table, in accordance with embodiments of the present disclosure.

FIG. 2 is a flow diagram illustrating an example method 200 for updating data structures of the hash table, in accordance with embodiments of the present disclosure. In embodiments, the method 200 updates the hash function to ensure that there will be no collisions between profiled values in the table when hashed with the updated function once the new observed program value is added to the table. The method 200 is a sub process of block 180 in FIG. 1.

In response to successfully locking the hash table (block 170 of FIG. 1), the hash function of the hash table is updated at block 210. Updating the hash function avoids collisions between values already in the table and the observed program value being added to the table. For example, by selecting a bit in the value binary representation, the newly observed value and those already in the hash table are split based on the difference of one or more bits in in their respective binary representations. Separating out the newly observed values from those already in the hash table, bit selection is then recursively repeated on each key, until all keys in the hash table have a unique hash code produced through bit selection. Collectively, the selected bits can be extracted to produce a bit extract mask, indicating which bits to keep and which bits to clear. The operation of bit extraction is accomplished using bitwise operations (e.g., ANDing, ORing) and bit shifting to compact the bits together.

Figure 3:
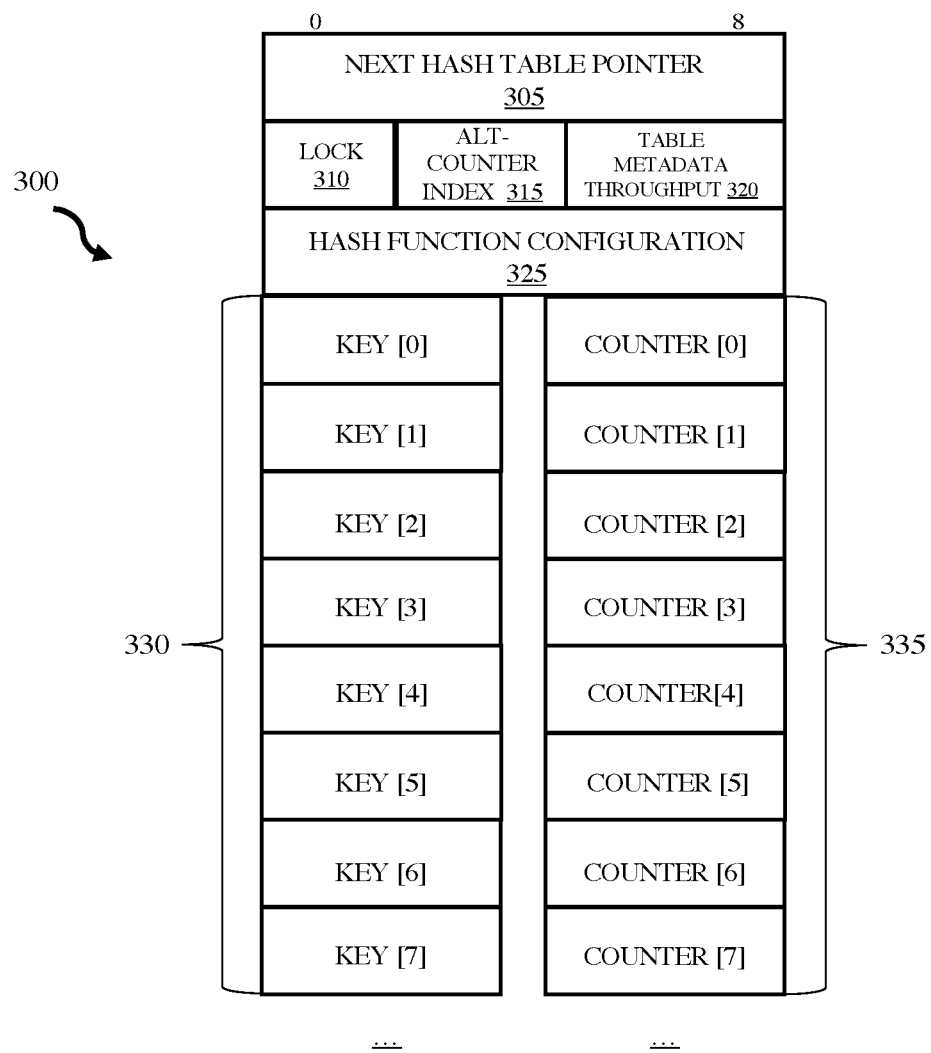
FIG. 3 is a diagrammatic depiction of an example hash table layout, in accordance with embodiments of the present disclosure.

The process of selecting a bit can be biased to increase the chances of preserving the existing hash table layout, as described in more detail with respect FIG. 3. For example, when selecting the first bit, a significant bit can be selected so existing bits and offsets do not have to change. In embodiments, a significant bit is a bit that is higher in the hash table than any other bit, set in the existing mask.

Updating the hash function at block 210 is followed by a rearrangement of any existing keys based on their new indices, at block 220. For example, in embodiments, when a significant bit is selected, the selected bit represents the new entry for the hash table and is indicated with a value of 1. The remaining bits in the hash table are cleared and each existing entry is assigned a value of 0. The newest bit index is located in highest position in the hash table.

New observed values can be incremented and stored with an initialized counter of the hash table, at block 230. Upon completion of updating the hash table, the initialized counter is incremented, the hash table lock is released, and execution returns to the main line for further processing, at block 240.

It is noted that FIG. 2 is intended to depict the representative operations of an example process 200 for updating the hash table. In some embodiments, however, individual operations can have greater or lesser complexity than as represented in FIG. 2, operations other than or in addition to those shown in FIG. 2 can be present, and the number, type, and configuration of such operations can vary.

FIG. 3 is a diagrammatic depiction of an example hash table layout 300, to reduce memory overhead in accordance with embodiments of the present disclosure. The example layout 300 enables improvements to the hash table representation to simplify updates and reduce memory overhead.

A hash table (concurrently referred to hereinafter as a hash map) is a data structure used to implement an associative array, a structure that can map keys to values. The hash table layout 300 includes a plurality of data storage structures including a next hash table pointer 305, hash table lock 310, alt-counter index 315, table metadata throughput 320, hash function configuration 325, a plurality of key blocks 330, and a plurality of counter blocks 335.

In embodiments, the profiling tables the compiler generated are linked into a linked list. The scanning thread used to check the size of the alt-counter (similar to one or more thread comprised in FIG. 1) follows the pointer 305. Pointer 305 enables the scanning thread to easily walk over all the hash tables.

The lock 310 is used for synchronizing operations on the hash table. In embodiments, the lock 310 is used to control adding a new entry into the hash table. Lock 310 prevents more than one thread of execution adding an entry at a time.

Alt-counter index 315 is the alt-counter entry index. In embodiments, an alt-counter is made to record the number of non-profiled values (e.g. values not present in the key set of the hash table) encountered during program execution. Recording the number of non-profiled values allows the rate of presentation of recorded values to computed.

Table metadata throughput 320 includes information necessary to identify the value in the original program being recorded by the hash table. In embodiments, information consists of the kind of value being recorded, the bytecode offset where this value occurred, and the method in which it occurred.

Hash function configuration 325 stores the configuration of the hash function necessary for the application of the runtime derived hash function to observed program values at runtime. In embodiments, it is the bit extraction mask used to produce the hash table offset from an observed program value (operation 110 in method 100 in FIG. 1).

Wasted slots (e.g., cleared, empty) can be used to profile additional observed program values, but doing so is dependent on the hash function mapping an observed program value to one of these wasted slots. In embodiments, the alt-counter uses one wasted slot. One or more additional wasted slots can be used to profile other observed program values, but only when the hash configuration maps the observed program value to an unpopulated slot. The number of wasted slots can be expressed as $2^n-n-1$ for n bits, resulting in at least 1 empty slot for 2 or more bits. As such, bit extraction can only guarantee the profiling of n+1 values. Wasted slots can be reused to store additional metadata in the key arrays and the alt-counter in the counter array, with the index specified in the table metadata throughput 320. This approach can be extended for larger hash tables by storing additional values, hereinafter referred as non-guaranteed value, after the hash table has reached its limit and as long as the non-guaranteed values indices do not collide with any observed program values already present in the table.

Key block 330 comprises the 2 n key array blocks established for frequently observed values. In the embodiment shown in FIG. 3, 8 key array blocks (e.g., key[0]-key[7]) exist, each designated with a different purpose. However, it is to be understood that, in other embodiments, other numbers of key array blocks can be used. In FIG. 3, one embodiment using the hash map would use key [0] is the array slot for the first entry. Key[1] is used when a second entry is added. Between key[2] and key[3], one slot will be used when a third entry is added, and one slot will be left over and used as additional metadata and alt-counter. Between key[4], key[5], key[6], and key[7], one slot will be used when the fourth entry is added, while the three remaining slots are used as additional non-guaranteed values should suitable values be observed during program execution.

Similarly, counter block 335 comprises the 2 n counter array blocks established for frequently observed values. In the embodiment shown in FIG. 3, 8 counter array blocks (e.g., counter[0]-counter[7]) are used, all serving a specified purpose related to their corresponding key pair. However, it is to be understood that, in other embodiments, other numbers of counter array blocks can be used. Each non-zero count indicates its corresponding key holds a real value.

In embodiments, each observed value will have an individual key from key blocks 330 and an individual counter for counter block 335 to comprise a key and counter pair for an observed program value. For example, the first observed value index in the subset of observed values can comprise corresponding key[0] and corresponding counter[0], where the index value at counter[0] matches the key[0] value at the observed value index.

While FIG. 3 illustrates an improved example hash table layout 300 with hash table pointer 305, hash table lock 310, alt-counter index 315, table metadata throughput 320, hash function configuration 325, a plurality of key blocks 330, and a plurality of counter blocks 335, suitable computing environments for implementing embodiments of this disclosure can include any number of data structures. Throughput overhead is limited by the table capacity, based on the observation that only the most frequent value is of interest for optimization.

In some embodiments, however, individual data structures can have greater or lesser complexity than as represented in FIG. 3, data structures other than or in addition to those shown in FIG. 3 can be present, and the number, type, and configuration of such operations can vary.

Figure 4:
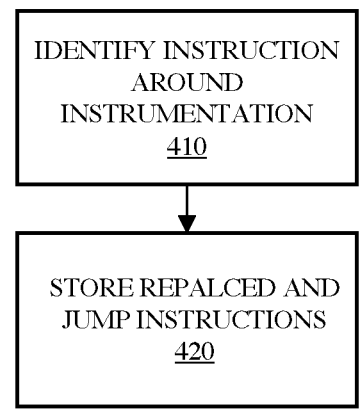
FIG. 4 is a flow diagram illustrating an example method for toggle implementation, in accordance with embodiments of the present disclosure.

FIG. 4 is a flow diagram illustrating an example method 400 for toggle implementation to reduce throughput overhead, in accordance with embodiments of the present disclosure. The process 400 can be implemented concurrently with the method 100 of FIG. 1.

In some embodiments, it is desirable to provide a mechanism with which a control thread can toggle the collection of profiling data between states (e.g., on/enabled, off/disabled) such that the disabled state incurs a reduced throughput overhead. Illustrated at block 410, a consistent initial instruction in the profiling implementation can be identified or an added computer protocol command (e.g., unconditional jump instruction, Boolean logic) can be placed into the implementation of method 100 such that a jump to the bottom of the implementation can occur. The initial instruction or computer protocol command (e.g., jump command) can then toggle profiling data between alternative patches of program flow (e.g., instruction/NOP). Additionally, some embodiments may choose to reduce profiling overhead using a conditional jump at the cost of precision.

To allow for continuous toggling between profiling states, illustrated at block 420, replaced instructions and jump instructions are saved as to allow for a reset if a determination is made. Instructions can then be stored by the Java Virtual Machine either in memory or on a disk in some fashion.

Toggling enables more efficient recompilation strategies such that compilations exclusively for profiling are no longer necessary. It is noted that FIG. 4 is intended to depict the representative operations of an example method 400 for toggle implementation. In some embodiments, however, individual operations can have greater or lesser complexity than as represented in FIG. 1, operations other than or in addition to those shown in FIG. 1 can be present, and the number, type, and configuration of such operations can vary.

Figure 5:
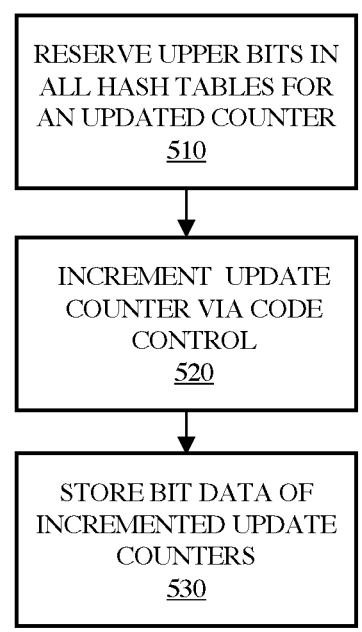
FIG. 5 is a flow diagram illustrating an example method for hash table reset, in accordance with embodiments of the present disclosure.

FIG. 5 is a flow diagram illustrating an example method 500 to reset the hash table when thread racing is detected, and more specifically, during table rearrangement and clearing, in accordance with embodiments of the present disclosure.

As discussed above, a potential to lose an increment can be incurred during table rearrangement and clearing. Such operations should not race with each other as they are sufficiently infrequent to make use of the table lock. However, situations can arise in which they may race with counter increments. Depending on the implementation of the architecture, it may be more efficient to detect these situations and reset the table as necessary, rather than complicating the more frequent increments, as discussed in the example implementation of FIG. 5.

In particular, in the implementation shown in FIG. 5, the upper bits in all counters of the hash table are reserved for an update counter, at block 510. During each table update that manipulates existing counters, control code increments the update counter, at block 520. The control code rearranges the incremented update counter such that it sets it as the upper bits for all counters.

The upper bit data for all incremented update counters are then stored in the tables metadata, at block 530. Table metadata is similar to table metadata throughput 320 of FIG. 3. During later accesses to the hash table, a detection pass is performed, so as to ensure the upper bits for all counters match the stored update counter.

It is noted that FIG. 5 is intended to depict the representative operations of an example process 500 for hash table reset concerning table rearrangement and clearing. In some embodiments, however, individual operations can have greater or lesser complexity than as represented in FIG. 5, operations other than or in addition to those shown in FIG. 5 can be present, and the number, type, and configuration of such operations can vary.

Figure 6:
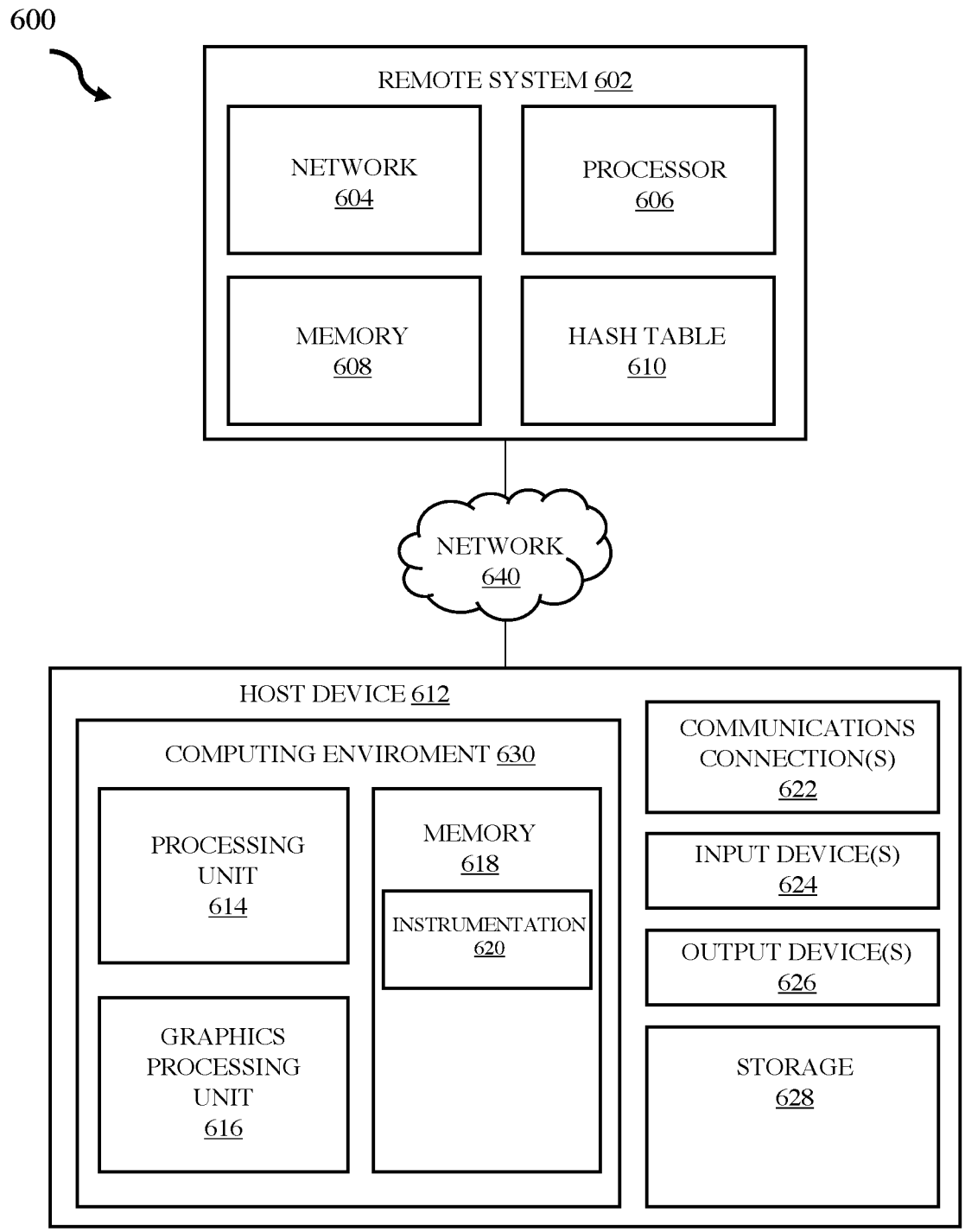
FIG. 6 is a block diagram illustrating an example computer environment, in accordance with embodiments of the present disclosure.

FIG. 6 depicts a block diagram of an example computing environment 600 in which embodiments of the present disclosure can be implemented. In some embodiments, aspects of computing environment 600 can perform the methods described in one or more of FIGS. 1-2 and 4-5 and utilize the improved hash table layout in FIG. 3. In the embodiment shown in FIG. 6, the computing environment 600 includes a remote system 602 and a host device 612.

According to embodiments, the host device 612 and the remote system 602 can be computer systems. The remote system 602 and the host device 612 can include one or more processors 606 and 614 and one or more memories 608 and 618, respectively. The remote system 602 and the host device 612 can be configured to communicate with each other through an internal or external network interface 604 and communications connection(s) 620 (e.g., modems or interface cards). The remote system 602 and/or the host device 612 can be equipped with a display or monitor. Additionally, the remote device 602 and/or the host device 612 can include optional input devices (e.g., a keyboard, mouse, scanner, or other input device), and/or any commercially available or custom software (e.g., browser software, communications software, server software, natural language processing software, search engine, and/or web crawling software, filter modules for filtering content based upon predefined parameters, etc.). In some embodiments, the remote system 602 and/or the host device 612 can be servers, desktops, laptops, or hand-held devices.

The remote system 602 and the host device 612 can be distant from each other and can communicate over a network 640. In embodiments, the host device 612 can be a central hub from which a remote system 602 and other remote devices (not pictured) can establish a communication connection, such as in a client-server networking model. In some embodiments, the host device 612 and remote system 602 can be configured in any other suitable network relationship (e.g., in a peer-to-peer configuration or using another network topology).

In embodiments, the network 640 can be implemented using any number of any suitable communications media. For example, the network 640 can be a wide area network (WAN), a local area network (LAN), the Internet, or an intranet. In certain embodiments, the remote system 602 and the host device 612 can be local to each other, and communicate via any appropriate local communication medium. For example, the remote system 602 and the host device 612 can communicate using a local area network (LAN), one or more hardwire connections, a wireless link or router, or an intranet. In some embodiments, the remote system, the host device 612, and any other devices can be communicatively coupled using a combination of one or more networks and/or one or more local connections. For example, the remote system 602 can be hardwired to the host device 612 (e.g., connected with an Ethernet cable) while a second device (not pictured) can communicate with the host device using the network 640 (e.g., over the Internet).

In some embodiments, the network 640 can be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 640.

In some embodiments, the host device 612 can include input device(s) 624 and output device(s) 626 directly. The host device 612 can contain subcomponents, such as a computing environment 630. The computing environment 630 can include a processing unit 614, a graphics processing unit 616, and a memory 618. Memory 618 comprises instrumentation 620. In embodiments, instrumentation 620 can be executed by processing unit 614 to perform at least part of one or more of methods 100, 200, and/or 400-500 discussed above. The computing environment 630 can be configured to perform hash table processing to ingest hash table 610 from remote system 602. In various embodiments, hash table 610 comprises data structures.

The storage 628 can be configured to store the hash table, such as hash table 300, and associated data structure and can be connected to memory 618.

While FIG. 6 illustrates a computing environment 600 with a single host device 612 and a single remote system 602, suitable computing environments for implementing embodiments of this disclosure can include any number of remote devices and host devices. The various models, modules, systems, instructions, and components illustrated in FIG. 6 can exist, if at all, across a plurality of host devices and remote devices.

It is noted that FIG. 6 is intended to depict representative components of an example computing environment 600. In some embodiments, however, individual components can have greater or lesser complexity than as represented in FIG. 6, components other than or in addition to those shown in FIG. 6 can be present, and the number, type, and configuration of such components can vary.

Figure 7:
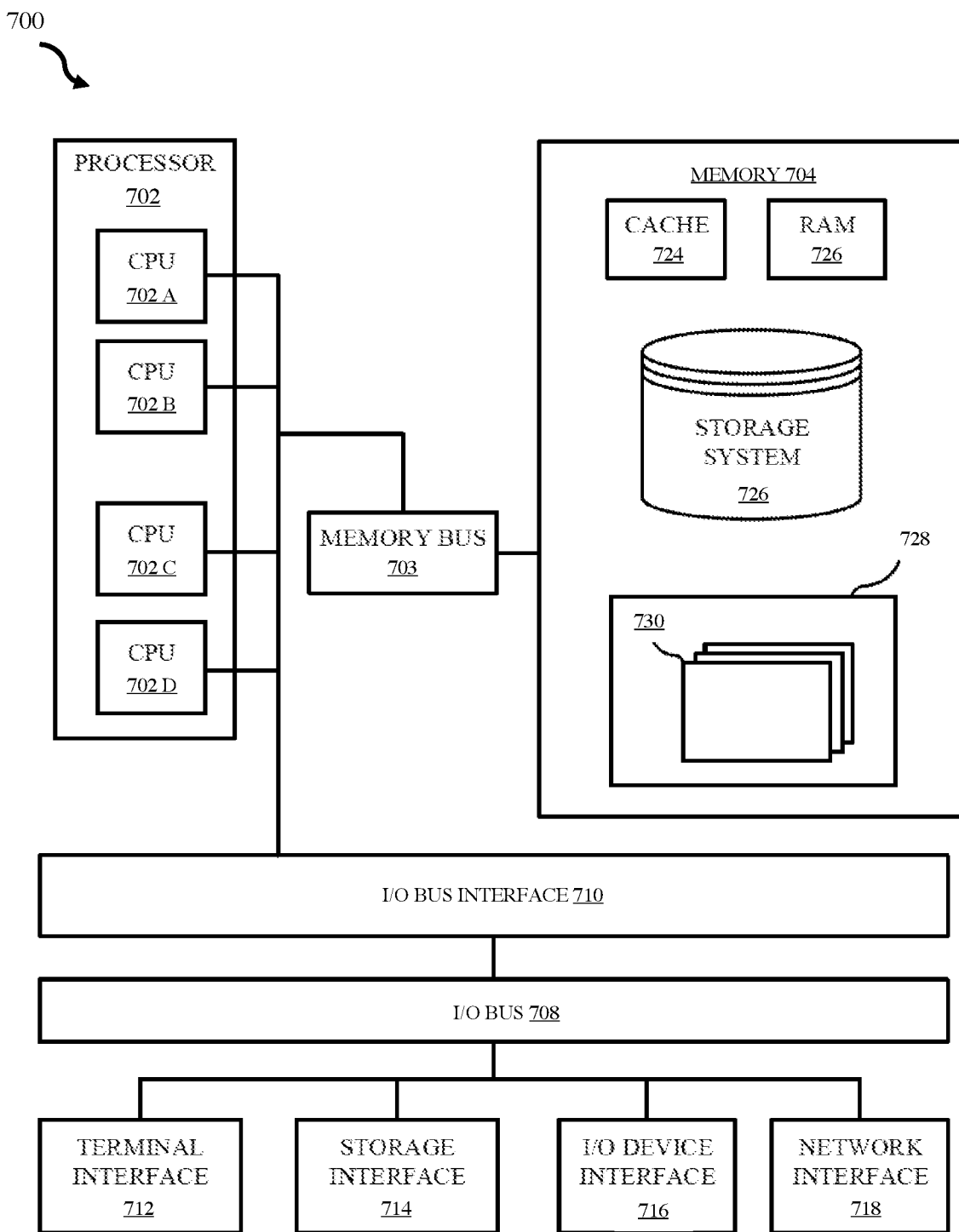
FIG. 7 is a high-level block diagram illustrating an example computer system that can be used in implementing one or more of the methods, tools, and modules, and any related functions, described herein, in accordance with embodiments of the present disclosure.

Referring now to FIG. 7, shown is a high-level block diagram of an example computer system 700 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of the various embodiments discussed above. For example, in some embodiments, the program modules 730 of the computer system 701 include a value profiling instrumentation.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 700 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict representative components of an exemplary computer system 700. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A value profiling implementation method for reducing overhead, the method comprising:
    gathering profiling data for a subset of observed values at runtime start;
    generating an index for each observed value;
    populating one or more data structures within a hash table with the subset of observed values to count;
    comparing a corresponding key at the index value of an observed value index;
    in response to a determination that the corresponding key at the observed value index matches the corresponding observed value index, incrementing a matched key counter that represents a counter for observed values that are profiled, wherein an alt-counter represents a counter for observed values that are excluded from profiling;
    periodically inspecting, via a separate management thread, a sum of the counts of a plurality of matched key counters and the alt-counter to determine if the profiled values represent the most frequently observed values; and
    in response to a determination that the profiled values do not represent the most frequently observed values, repopulating the hash table keys by clearing entries of the hash table keys.

2. The method of claim 1, further comprising:
    in response to a determination that the corresponding key at the observed index does not match the observed value index, evaluating a value limit of the hash table;
    in response to a determination that the value limit of the hash table has been reached, incrementing the alt-counter;
    in response to a determination that the value limit of the hash table has not been reached, attempting a locking of the hash table;
    in response to a determination that locking fails, incrementing the alt-counter; and
    in response to a determination that the hash table is successfully locked, updating one or more data structures of the hash table, wherein the hash table update is implemented as a helper call.

3. The method of claim 1, wherein one or more data structures of the hash table further comprises:
    2 n matched key and counter pairs representing profiling data for n+1 recorded values, wherein n is a variable representing a plurality of bits required to create an offset into the hash table and distinguish profiled values;
    the alt-counter
    a hash function configuration, wherein the hash function configuration comprises an associated hash function with corresponding bit indices created during bit extraction;
    table metadata throughput; and
    a hash table lock.

4. The method of claim 3, wherein in a response to a determination that one or more data structures of the hash table is wasted, the wasted data structure is reused for additional metadata storage in the 2 n matched key and counter pairs, wherein the number of wasted slots is expressed as $2^n-n-1$ for n bits.

5. The method of claim 1, wherein updating data structures of the hash table further comprises:
    updating the hash function to avoid a collision between the observed value index and observed program value indices;
    rearranging existing $2n$ keys based on their index value;
    storing the observed value index with an initialized counter; and
    releasing the hash table lock.

6. The method of claim 5, wherein in a response to hash table rearrangement, the upper bits in the 2 n counters of the hash table are reserved for an update counter, wherein code control increments the update counter and stores the update counter data in the table metadata throughput.

7. The method of claim 1, wherein profiling data is implemented through value profiling, wherein the profiling limit is determined by a plurality of key and counter pairs, wherein continuous toggling occurs between enabled and disabled profiling stages.

8. The method of claim 7, further comprising disabling execution of profiling instrumentation in response to a determination that the profiled values do not represent the most frequently observed values.

9. A value profiling implementation method for reducing overhead while an application is running with profiling instrumentation inserted but disabled, the method comprising:
    gathering profiling data for a subset of observed values at runtime start;
    generating an index for each observed value;
    populating one or more data structures within a hash table with the subset of observed values to count;
    comparing a corresponding key at the index value of an observed value index;
    in response to a determination that the corresponding key at the observed value index does not match the corresponding observed value index, evaluating a value limit of the hash table;
    in response to a determination that the value limit of the hash table has been reached, incrementing an alt-counter, wherein the alt-counter represents a counter for observed values that are excluded from profiling;

periodically inspecting, via a separate management thread, a sum of the counts of a plurality of matched key counters and the alt-counter to determine if the profiled values represent the most frequently observed values; and in response to a determination that the profiled values do not represent the most frequently observed values, repopulating the hash table keys by clearing entries of the hash table keys.

10. The method of claim 9, wherein one or more data structures of the hash table further comprises:

2 n matched key and counter pairs representing profiling data for n+1 recorded values, wherein n is a variable representing a plurality of bits required to create an offset into the hash table and distinguish profiled values;

the alt-counter;

a hash function configuration, wherein the hash function configuration comprises an associated hash function with corresponding bit indices created during bit extraction; and table metadata throughput.

11. The method of claim 10, wherein in response to a determination that the number of observed values that are excluded from profiling exceeds the profiling limit while the profiling is enabled, resetting the profiling data, wherein a profiling reset limit is determined by the 2 n matched key and counter pairs.

12. The method of claim 9, further comprising continuous toggling between enabled and disabled profiling stages.

* * * * *